W. T. HOOFNAGLE.
REFRIGERATING METHOD.
APPLICATION FILED JULY 8, 1915.
1,230,482.
Patented June 19, 1917.
2 SHEETS—SHEET 1.
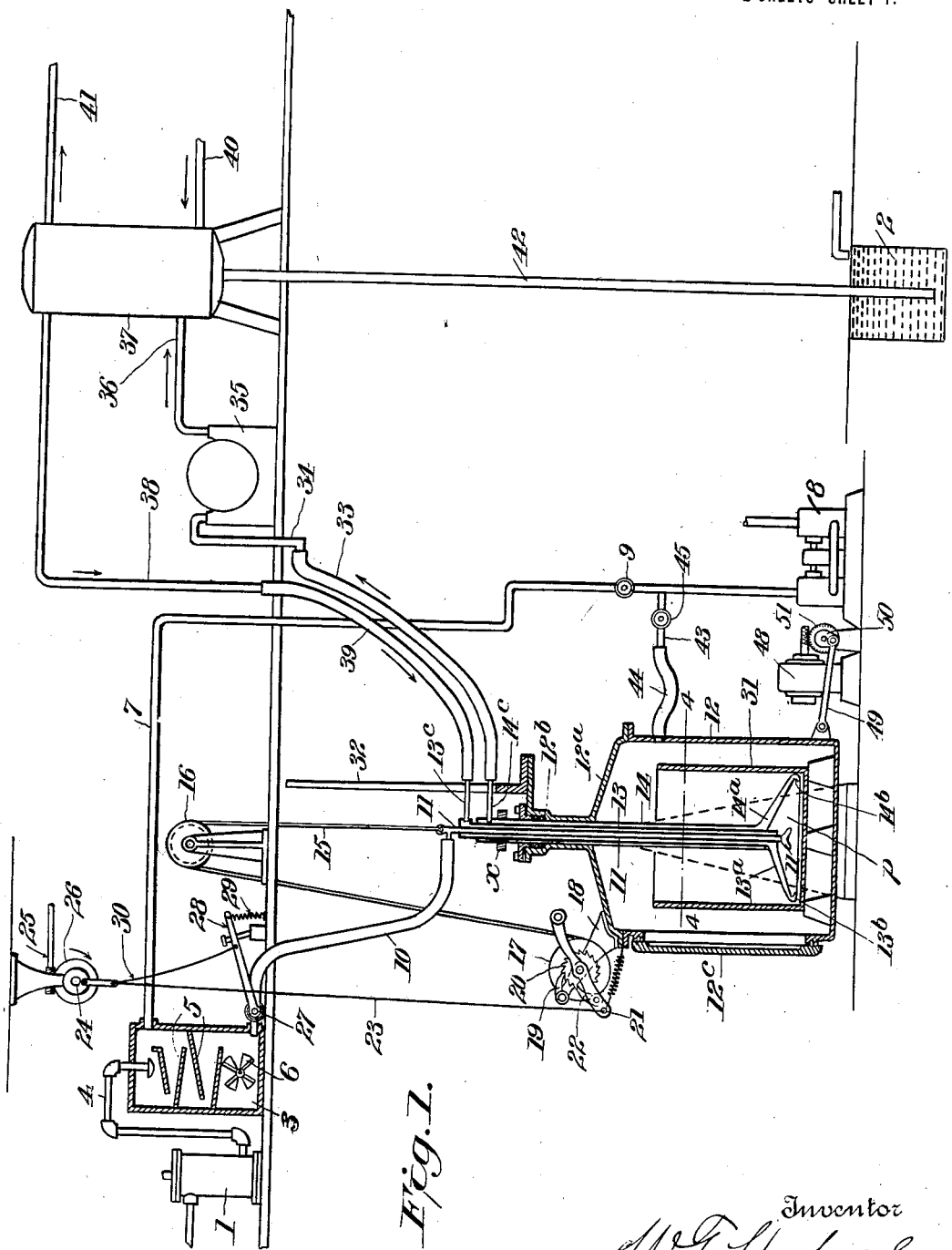

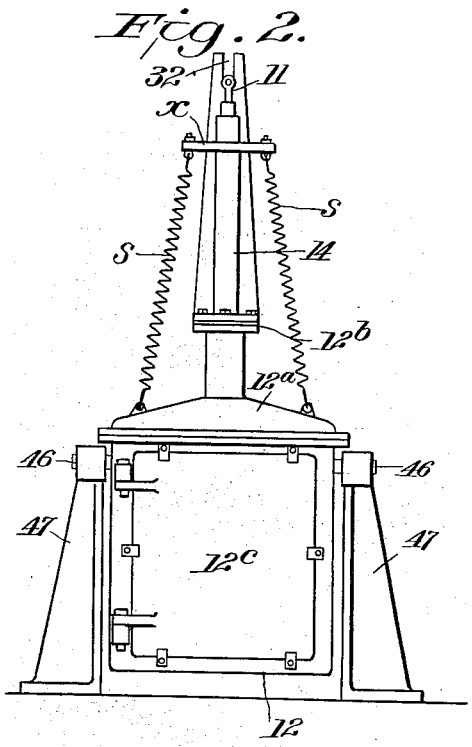
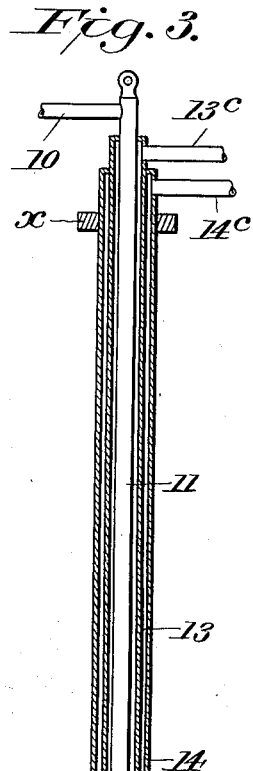
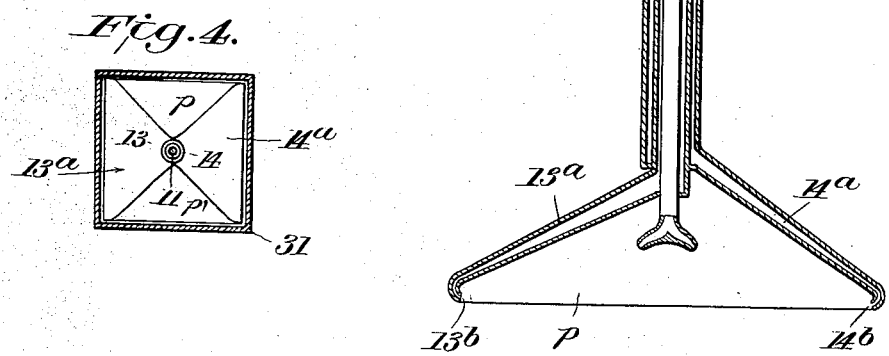

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

REFRIGERATING METHOD.

1,230,482.      Specification of Letters Patent.      Patented June 19, 1917.

Application filed July 8, 1915. Serial No. 38,738.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Refrigerating Methods, of which the following is a specification.

This invention relates to an improved method of freezing liquids by the vacuum process. In manufacturing ice by the vacuum process, it is customary to maintain a very high vacuum in the freezing chamber, excluding air from the chamber and from the water, as much as possible, and in order to dispose of the water vapor drawn from the freezing chamber in large volume, the vapor is usually passed through absorbers containing sulfuric acid or other liquid having an affinity for water, other more or less expensive apparatus being required to separate the water from the absorbent fluid. I have found that by causing a current of air to flow in proximity to the water in the freezing chamber and to be carried out by the exhaust mechanism along with the vapors, the vaporization of the water, at any given pressure, is much more rapid than would be the case if the air were excluded. Hence, the water may be congealed more rapidly than by the usual method, if the same pressure is maintained, or the water may be congealed by the present method, at a pressure above that at which freezing will occur by the usual vacuum process, where the air is excluded.

In carrying out my invention, I provide a suitable freezing chamber in which is placed a can or container to receive the water to be frozen, and the water is admitted in regulated quantities, intermittently, to said container, while the freezing process goes on, the container being oscillated slightly to cause the water in the container to flow back and forth and freeze in successive layers into a solid block. The vacuum chamber is exhausted to a certain degree by suitable exhaust mechanism, and then by means of another exhaust mechanism, the vapors and air within the chamber are drawn out and passed through a condenser where the vapors are condensed and eliminated from the system, while the air is returned through suitable conduits and caused to flow close to the body of water in the freezing chamber, thence returning, with the vapors, to the condenser, where the vapors are condensed and the air returned as before.

In the accompanying drawing which illustrates the invention,

Figure 1 is an elevation, partly in section, of a plant for carrying out my invention;

Fig. 2 is a front elevation of the freezing chamber;

Fig. 3 is a vertical section through the system of tubes by which air and water are admitted to the freezing chamber and air and water vapor are withdrawn; and Fig. 4 is a section on the line 4—4 of Fig. 1.

Referring to the drawing, 1 indicates a pump for delivering distilled water, from a suitable source, preferably the well 2, to a deaerating chamber 3, through a spray pipe 4. The deaerating chamber contains baffles 5 and an agitating device 6, and this chamber is connected by a pipe 7 to an exhaust pump 8. The apparatus thus far described is substantially the same as that illustrated in my prior Patent No. 828,888, and in operation the water flows over the baffles in a thin stream and is agitated in the bottom of the chamber, and any air entrained in the water passes off through the pipe 7. The pump 8 is constantly in operation and the valve 9 in the pipe 7 remains partly or wholly open.

The water from the deaerating chamber 3 is allowed to pass at intervals, in regulated quantities, through a flexible pipe 10 to the pipe 11, which extends into a closed freezing chamber 12. This pipe 11 is secured near its upper and lower ends within a larger surrounding pipe 13, and the latter is inclosed by a still larger pipe 14. The last mentioned pipe passes through a central opening in the top 12$^a$ of the freezing chamber, and fits as nearly air-tight as possible within a suitable stuffing box 12$^b$. The entire nest of pipes is movable vertically and is suspended by a cable 15 which passes upwardly over a grooved pulley 16 and thence downwardly to a drum 17, arranged upon suitable supporting brackets 18, secured to the freezing chamber, one of said brackets being shown in Fig. 1. The drum is held against backward rotation by a pawl 19, one one of said brackets, which pawl engages a ratchet wheel 20, secured to the drum shaft. The drum shaft is movable to raise the series of nested tubes by means of a ratchet lever 21, journaled on the drum shaft, a pawl 22 pivoted to said lever, and a cable 23, which latter connects the ratchet lever with a crank on a shaft 24. The drum shaft and crank are slowly turned by suitable means, such as a constantly driven worm shaft 25, engaging a worm wheel 26 on the shaft 24. A cross-piece x, secured to the pipe 14 near its upper end, is connected by springs s to the cover of the freezing chamber, these springs being for the purpose of forcing the nested tubes downward when the holding pawl 19 of the ratchet mechanism is released. The means for admitting water through the pipes 10 and 11 to the freezing chamber, intermittently, comprises a valve 27 in the pipe 10, a lever 28 connected to said valve, a spring 29 for normally holding the valve closed, and a cable 30 connecting the valve lever to a crank on the shaft 24, the arrangement being such that as the shaft revolves the valve will be opened and then closed, permitting a pre-determined quantity of water to enter the freezing chamber each time the valve is operated. The time during which the valve is opened, at each revolution of the shaft, may be regulated by lengthening or shortening the cable 30.

The freezing chamber 12 is provided with a suitable door 12c to permit of the insertion and removal of a freezing can or vessel 31. This can is open at the top and the air and water pipes are lowered into the can at the commencement of the freezing operation and gradually raised by the ratchet mechanism before described during the freezing operation, at the end of which the tubes are raised above the can and the latter removed from the freezing chamber. The water pipe 11 is provided with a suitable outlet opening at its lower end, and the inner and outer air pipes 13 and 14 are provided, respectively, with oppositely inclined fan-shaped nozzles 13a and 14a. These nozzles extend to opposite sides of the freezing can or vessel and are provided with slots 13b and 14b at their wider ends, through which the air and vapors may pass. Triangular plates p and p' connect the edges of the nozzles together and form, with the nozzles, a low pyramidal hood extending nearly to the sides of the can. The pipes 13 and 14 have short horizontal branches 13c and 14c, respectively, at their upper ends, which extend into a vertical slot in an upright guide 32, and the pipes are thus prevented from turning during their vertical movements. The pipe 14 is connected through the branch 14c, flexible tube 33, and pipe 34 to the suction end of the exhaust pump 35. The pipe 36 connects the compression end of the pump with a surface condenser 37, and a pipe 38 leads from the opposite end of the condenser to a flexible pipe 39 which is connected to the extension 13c of the air pipe 13. It will be seen from this arrangement that a return circulating system for air is provided from the interior of the freezing can through the nozzle 14a to the pump 35 and thence to the condenser, thence to nozzle 13a within the freezing can, and thence across the can to the nozzle 14a. The hood extends close to the water and the air travels swiftly over the surface of the water beneath the hood. The surface condenser is provided with the usual inlet and outlet pipes 40 and 41, respectively, for the cooling water, and it is connected by a long pipe 42 to the well 2, which receives the water of condensation. Any vapor flowing through the return circulating system above described is condensed in the condenser and flows to the well, while air flowing through said system is continuously circulated.

The pipe 7 has a branch 43 connected by a flexible tube 44 to the upper portion of the freezing chamber, and a valve 45 is provided in the pipe 43, for opening and closing communication between the freezing chamber and the exhaust pump 8. The freezing chamber is mounted on trunnions 46, above its center of mass, journaled in suitable standards 47, and during the operation of the apparatus the freezing chamber is given a slight oscillating movement by suitable means, such as a motor 48 which operates a link 49 connected to the freezing chamber and to a crank 50, on a shaft which is slowly rotated by suitable worm gearing 51, driven by the motor. The oscillation of the freezing chamber and the can or receptacle therein, cause the water to flow back and forth in said receptacle, so that it will freeze in successive films and form a clear solid mass of ice.

In operation, the freezing can or vessel is placed within the freezing chamber and the nest of tubes is lowered until the nozzles of the air tubes are only a short distance above the bottom of the can. The valve 45 is then opened, to permit the pump 8 to exhaust the freezing chamber, and when a high vacuum has been created in this chamber, the valve 45 is either closed or left slightly open. The rest of the mechanism being then put into operation, the air which is drawn from the water in the deaerating chamber 3 is carried out through the pipe 7 and exhaust pump 8 to the atmosphere. The valve 27 is opened to admit a charge of water to the freezing chamber, and then closed, the nest of tubes being lifted a short distance during the same revolution of the shaft 24. The freezing chamber is not exhausted to the same extent as in the usual vacuum system and a certain amount of air necessarily remains in the freezing chamber, and this is augmented by air which is entrained in the water, even after passing through the deaerating device. The pump 35 causes vapor and air to flow from the freezing can through the pipes 14, 33 and 34 to the pump, thence through pipe 36 to the condenser, where the vapor is condensed and passes to the well 2, while the air returns through the pipes 38, 39 and 13 to the nozzle 13ª, thence flowing swiftly across the surface of the water beneath the hood in the freezing can to the nozzle 14ª, and being then again carried, with the vapors, to the condenser. The evaporation is carried on much more rapidly by reason of the presence of the air than can be accomplished with a vacuum system in which the air is excluded. I have found that there is a marked advantage in having the air flow close to the water, rather than at a distance from it, and hence the air nozzles are lowered close to the bottom of the can at the commencement of operations and raised step by step as the ice builds up. As the water is admitted intermittently and the freezing chamber is oscillated, the water flows back and forth and freezes in thin successive films, the admission of water being regulated so that when one charge is almost or quite entirely congealed, another charge will be admitted, and the air nozzles will be raised at approximately the same time so that the air current will always be close to the surface of the body of water. The valve 45 will ordinarily be left slightly open in order to relieve the vacuum chamber of any excess amount of air accumulating from the water, but this valve may be closed, and opened when found necessary as indicated by the barometer usually employed in connection with such apparatus.

What I claim is:

1. The method of making ice which comprises admitting water to a suitable vessel, causing a current of air to enter the chamber in close contact with the water, and withdrawing air and vapor from said vessel by suitable exhaust mechanism.

2. The method of making ice which comprises intermittently admitting water to a suitable vessel, causing the water to flow back and forth therein, causing a current of air to enter the chamber in close contact with the water, and withdrawing air and vapor from said vessel by suitable exhaust mechanism.

3. The method of making ice which comprises admitting water to a suitable vessel, causing a current of air to enter the chamber in close contact with the water, withdrawing air and water vapor from the vessel by suitable exhaust mechanism, separating the vapor from the air, and returning the air to said vessel.

4. The method of making ice which comprises intermittently admitting water to a suitable vessel, causing the water to flow back and forth therein, causing a current of air to enter the chamber in close contact with the water, withdrawing air and water vapor from the vessel by suitable exhaust mechanism, separating the vapor from the air, and returning the air to said vessel.

5. The method of making ice which comprises admitting water to a suitable vessel, causing a current of air to enter the chamber in close contact with the water, withdrawing air and water vapor from the vessel by suitable exhaust mechanism, condensing the vapor, and returning the air to said vessel.

6. The method of making ice which comprises admitting water intermittently in regulated quantities to a suitable chamber, causing the water to flow back and forth therein, passing a current of air over the water in close contact therewith and maintaining a high vacuum in said chamber with suitable exhaust mechanism.

In testimony whereof I have affixed my signature.

WILLIAM T. HOOFNAGLE.

Witness:
LAURA E. SMITH.